United States Patent [19]

Wheatley et al.

[11] Patent Number: 5,058,652
[45] Date of Patent: * Oct. 22, 1991

[54] TONNEAU COVER

[76] Inventors: Donald G. Wheatley; Patricia A. Wheatley, both of 2298 S. Industrial Hwy., Ann Arbor, Mich. 48104

[*] Notice: The portion of the term of this patent subsequent to Jan. 27, 2004 has been disclaimed.

[21] Appl. No.: 339,223

[22] Filed: Apr. 17, 1989

Related U.S. Application Data

[63] Continuation-in-part of Ser. No. 324, Jan. 5, 1987, abandoned, which is a continuation of Ser. No. 650,275, Sep. 14, 1984, abandoned.

[51] Int. Cl.[5] .................................. B60J 7/10
[52] U.S. Cl. .................................... 160/327; 160/328; 296/100
[58] Field of Search .................. 160/327, 328, 378; 296/100

[56] References Cited

U.S. PATENT DOCUMENTS

| | | | |
|---|---|---|---|
| 3,186,129 | 6/1965 | Blood | 160/378 X |
| 3,373,464 | 3/1968 | Ausnit | 160/327 X |
| 3,727,972 | 4/1973 | Belk | 296/100 |
| 4,639,033 | 1/1987 | Wheatley et al. | 160/327 X |
| 4,792,179 | 2/1988 | Sterns | 160/327 X |

Primary Examiner—Blair M. Johnson
Attorney, Agent, or Firm—Charles W. Chandler

[57] ABSTRACT

A flexible cover for mounting over the cargo area of a vehicle such as a pick-up truck, boat or the like, having resilient, J-shaped extruded fasteners attached along the edges of the cover for fastening it to outwardly extending longitudinal edges on rails on the vehicle sidewalls. The J-shaped fasteners are formed of a resilient plastic which is mated with the rails in such a manner as to accommodate variations in the distance between the cargo box sidewalls, as well as variations in the flexibility of the flexible cover. The extruded members are adapted to be snapped together by applying a downward force on the J-shaped fasteners toward the rail until the edge of the rail snaps into the resilient fastener. The cover is removed by unzipping the J-shaped fastener from the rail to expose the cargo box area. To allow the covers to be put in place amd kept taut in both hot and cold weather, one of the rails can be provided with multiple parallel edges defining a channel between each pair of the edges so that one fastener can be brought into engagement with whichever edge will keep the cover taut in the direction perpendicular to that rail. The fastener along one edge can be T-shaped and slid longitudinally into engagement with the appropriate edge.

4 Claims, 3 Drawing Sheets

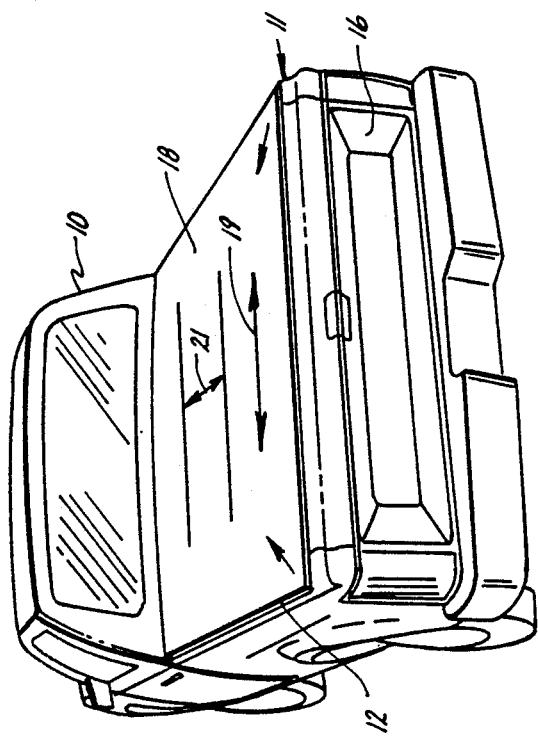
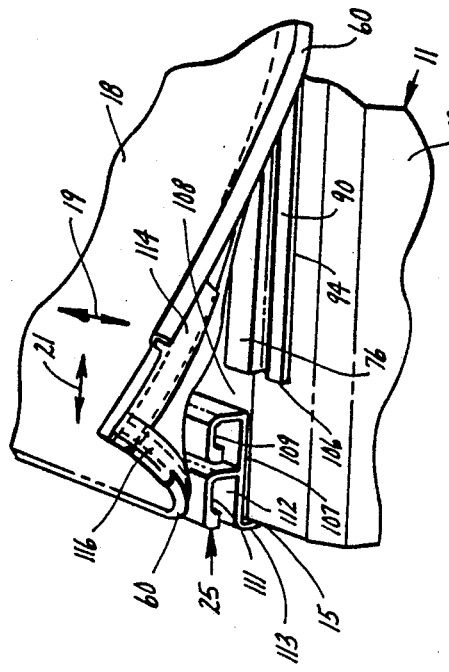
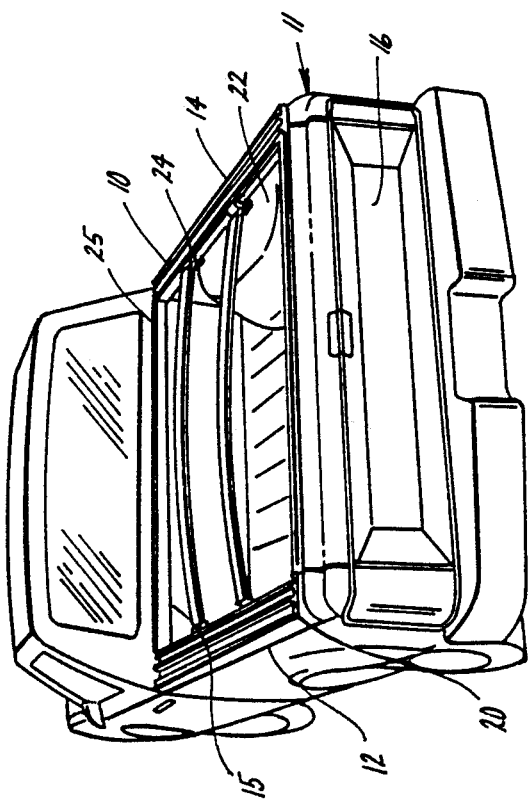
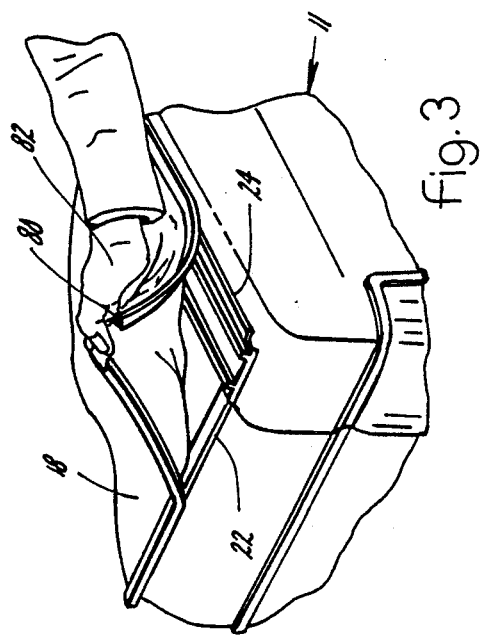

TONNEAU COVER

CROSS-REFERENCE TO RELATED APPLICATIONS

This application is a Continuation-in-Part of application Ser. No. 07/000,324, now abandoned filed Jan. 5, 1987 which was a continuation of application Ser. No. 06/650,275, filed Sept. 14, 1984, and now abandoned.

BACKGROUND OF THE INVENTION

This invention is related to tonneau covers and related support structures for enclosing the cargo area of a vehicle. In particular it relates to a cover structure in which the cover, itself, has a resilient extrusion stitched along at least one side edge of the cover to interlock with a complementary rail, usually extruded of aluminum, mounted along the top edge of cargo box. The rail includes at least one outwardly directed lip to be engaged by an inwardly turned lip of the resilient extrusion. In the case of a "J" shaped extrusion, the inwardly turned, resilient lip is adapted to unwind like a clock spring to accommodate variations in the dimensions of the cover and of the cargo box due, primarily, to changes in temperature of the environment. Normally the cover is attached to all four walls defining the entire perimeter of the cargo box and is cut to fit the box so as to be stretched relatively tight across it. Such covers have several problems. For example, the cargo box sidewalls of commercially-available pick-up trucks frequently vary in width because of manufacturing tolerances. Thus, a cover adapted to accommodate a class of vehicles frequently will be loose on some vehicles and tighter on others because the means for connecting the cover to the sidewalls do not accommodate such dimensional variations.

Another problem is that the tonneau cover is usually formed of a flexible material that can be somewhat stretched, however, some materials that are particularly suited for use as a tonneau cover do not stretch equally in both directions. We have found it desirable to fit covers so that they stretch very little in the longitudinal direction of the truck and stretch to a greater degree in the transverse direction. However, in cold weather, the material loses much of its flexibility and becomes stiff, and thus, hard to install and prone to tear. It also contracts in cold weather. During warmer weather, the flexible material becomes very soft and flexible, and thus, difficult to tension.

Further, commercially-available fastening devices for connecting a tonneau cover to a cargo box are difficult to attach and in some cases require drilling several holes in the cargo box sidewall. This detracts from the ultimate resale value of the vehicle and promotes corrosion of the metal in the area of the holes. In other cases, the existing attachment structures are relatively complicated and expensive to install and do not include convenient means for holding the cover so that it is taut but not over-tensioned at any time of the year.

SUMMARY OF THE INVENTION

The broad purpose of the present invention is to provide an improved cover and fastening structure for the cargo area of a vehicle, such as a pick-up truck or boat, in which the fastening structure accommodates variations in the distance between the sidewalls on which the cover is mounted, as well as variations in cover flexibility whether such variations are due to manufacturing tolerances or climatic conditions.

One embodiment of the invention includes a "J" shaped plastic extrusion that includes a base part, or flange, stitched along the side edge of the cover, and another part curved or bent, away from the plane of the base part to form an inwardly turned, resilient lip. The structure may also be said to define a bight.

Base members or rails, preferably formed of aluminum extrusion, are mounted on the cargo box sidewall so that they overlie and extend along the upper edges of the sidewall. Each such rail has at least one lip facing away from the cargo box area, and in the case of the rail along the front wall of the box, there are two or more lips to allow the "J" shaped fastener along the front of the cover to be placed in different positions for different climatic conditions. The resilient "J" shaped fastener is formed in such a manner that applying a downward force on it snaps the resilient lip around the edge of the aluminum rail. In effect, when the fastener is being so applied to the rail, the resilient lip momentarily winds more tightly until its extreme edge passes the edge of the rail. The "J" shaped fastener can be disengaged from the rail by applying a tensioning force that peels the cover back starting at a corner and causing the resilient lip to unwind progressively and temporarily as the extreme edge of the fastener passes the edge of the rail. This permits the edge of the cover to be drawn progressively back toward the cargo box, without disconnecting the fastening structure.

In the case of the rail along the front wall of the cargo box, it is more convenient to insert the resilient fastener endwise into the proper position to engage the desired one of the multiple edges on that rail. After that edge of the cover has been thus moved into the proper position relative to the cargo box, the other resilient fasteners can be snapped into place, preferably starting with one of the sidewall fasteners, followed by the fastener at the tailgate, and ending with the fastener along the upper sidewall.

On the sidewalls of the cargo box, the rail is mounted adjacent an interior, downwardly, depending wall, which is a structural feature of many commercially-available pick-up trucks. In some embodiments, it is held in place by a clamp that has a slot for receiving both the lower edge of the depending wall and a vertical wall of the rail. In others it is bolted to the depending wall. In the case of the depending wall held by a clamp, a threaded fastener, mounted in the portion of the clamp behind the depending wall so as to be hidden from view, attaches the rail to the sidewall without drilling any holes. The clamp also has a slot for receiving the end of a wooden slat which spans the cargo box for supporting the midsection of the cover. Although the fastening structure is preferably formed of extruded sections, both the single-edged rail for the sidewalls and tailgate, as well as the "J" shaped extrusion, can be formed of any structure having a uniform cross-section along its length, such as a sufficiently rigid plastic molding or a rolled formed strip of metal.

Another advantage of the inventive fastening structure is that it provides a continuous connection along the cover edge, thereby preventing wrinkles and eliminating concentrated loads in the cover material, which is typically an automotive-quality vinyl. When the cover is removed, the rail, preferably formed of bright, anodized aluminum, provides an attractive appearance and protects the top of the cargo box from damage.

Thus the preferred tonneau cover protects the cargo in the cargo area. The resilient "J" section maintains an even tension for a taut, wrinkle-free cover. The aluminum rails mounted along the top edges of the cargo box walls provide an attractive appearance. When the cover is removed, the rails can be easily installed without damage to the truck. The cover can be easily mounted on the rails or quickly removed by an unzipping action in which the user grasps a corner of the cover, or preferably a pull-tab attached to the cover at the corner, and raises it to progressively separate the extrusion from the rail along their length.

Still further objects and advantages will become readily apparent to those skilled in the art to which the invention pertains upon reference to the following detailed description.

DESCRIPTION OF THE DRAWINGS

The description refers to the accompanying drawings in which like reference characters refer to like parts throughout the several views and in which:

FIG. 1 is a view showing a tonneau cover mounted on the cargo box of a conventional pick-up truck;

FIG. 2 is a view similar to FIG. 1, but showing the cover removed from the fastening rails;

FIG. 3 is a view showing a corner of the cover raised prior to being unzipped from the cargo box;

FIG. 10 shows a fragment of a front corner of a cargo box with a modified rail arranged for adjustment of the tautness of the cover to accommodate different climatic conditions;

DESCRIPTION OF THE PREFERRED EMBODIMENTS

Figure 4:
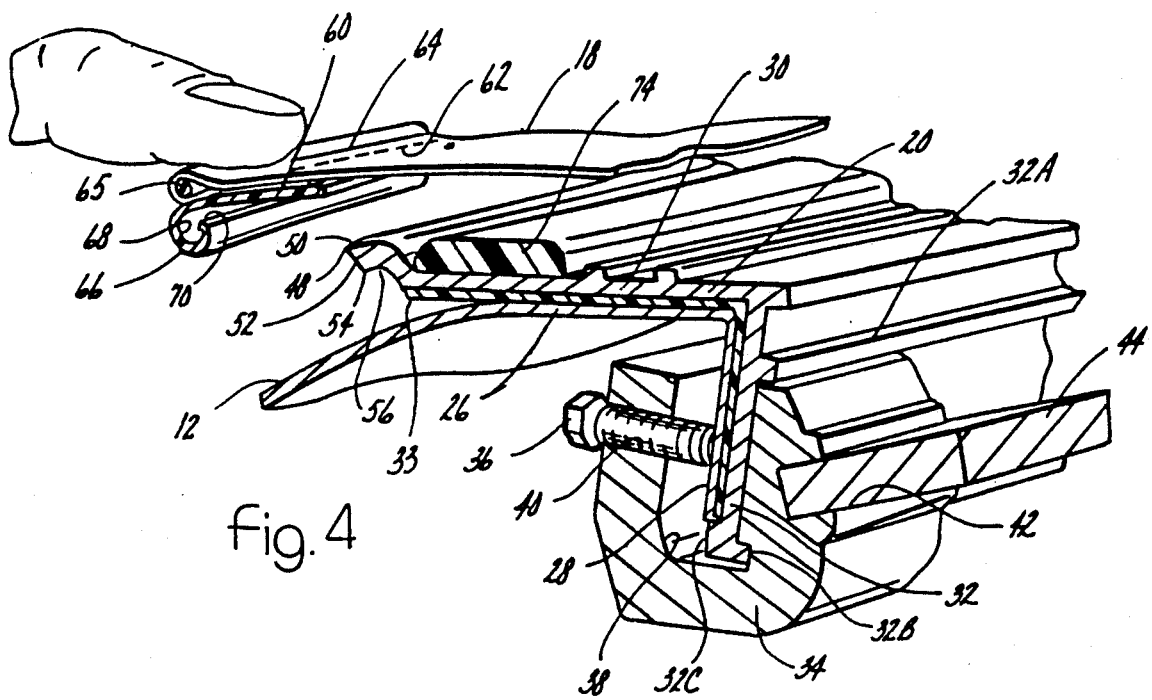
FIGS. 4-6 are views illustrating the manner in which the "J" shaped extrusion is connected to the rail lip.

FIGS. 1-2 illustrate a conventional pick-up truck 10 having a cargo box 11 that has a pair of sidewalls 12 and 14, a front or cab wall 15, and a rear wall, or as it is more commonly called, a tailgate 16. These four walls define the perimeter of a cargo box area of the vehicle. A vinyl fabric cover 18 is mounted on the walls to protect the interior of the cargo box 11 as well as its contents. The cover is preferably formed of a flexible fabric, such as a vinyl material used on the outer surfaces of automobiles, which has greater elasticity from side-to-side in the direction of a transverse arrow 19 than it does in the fore and aft position of an arrow 21.

Extruded aluminum rails 20, 22, 24, and 25 are mounted along the top of sidewall 12, tailgate 16, sidewall 14 and front wall 15, respectively. The cross-section of the rails 20 and 24 are identical, and the tailgate rail 22 is similar to the side rails 20 and 24. One embodiment of rail 20 is shown in FIG. 4 for illustrative purposes.

Referring to FIG. 4, the cargo box sidewalls, such as sidewall 12, is formed of sheet metal with a horizontal wall 26 and a downward depending, vertical wall 28. Rail 20 has a horizontal section 30 mounted on horizontal wall 26, and a vertical section 32 which is mounted adjacent vertical wall 28. Liner 33 of a high density polyethylene material is mounted between the rail and the sidewall to prevent squeaks and scratches.

A plurality of clamping means identical to clamp 34 and fastener 36, are mounted along the sidewalls and the tailgate for fastening the rails to the cargo box walls. Clamp 34 has a somewhat "C" shaped configuration with a slot 38 receiving both the lower edge of wall 28 and vertical section 32 of the rail. The width of the slot is greater than the combined thickness of the sidewall and the rail. The vertical wall of the rail has a pair of lips 32A and 32B for locating the clamp, and another lip 32C for locating the lower edge of liner 33.

Fastener 36 is received through a threaded opening 40 in the clamp to securely attach both the clamp and the rail to the sidewall. Fastener 36 is preferably a cadmium plated fastener with rust resistant properties.

This clamping arrangement eliminates the necessity for drilling any holes into the cargo box sheet metal. Each fastener is concealed behind the sidewalls so as not to scratch the contents of the cargo box. In addition, some trucks have an outwardly directed flange that extends upwardly and outwardly from the top of the sidewalls of the cargo box, thus serving the purpose of the rail 20.

The side of each clamp has a slot 42 for receiving the end of a slat 44 preferably made of wood. Slat 44 is one of several, each mounted with their ends mounted in the slots 42 of the clamps 34 to support the midsection of cover 18.

The outer edge of the rail has a lip 48 which extends away from the cargo box area. A similar lip is mounted on the companion rail 24 on the opposite side of the cargo box which also faces away from the cargo box. Lip 48 is defined by an upper cam surface 50 and a lower cam surface 52 which intersect to define a pointed edge. The lower edge of cam surface 52 terminates in ridge 54 and slot 56. The entire lip area is raised above the body of horizontal wall 30.

A "J" shaped, extruded fastener 60 of a polyethylene plastic is stitched at 62 to the edge of cover 18. The cover is also stitched at 64 to a plastic, stiffening rod 65. Fastener 60 has a curved lower lip 66 forming a partially cylindrical bight 68 for receiving rail lip 48. Lip 66 is resilient such that the extreme edge 70 of the fastener can be moved toward or away from the bight and the lip can unwind like a clock spring. In its relaxed position, edge 70 forms an opening for receiving rail lip 48.

Figure 5:
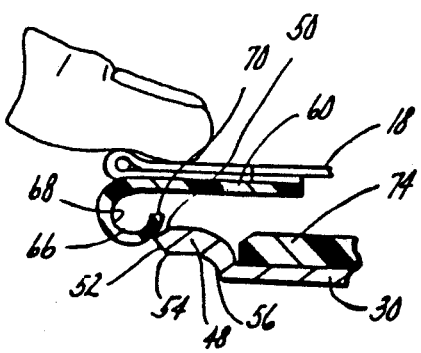
Figure 6:
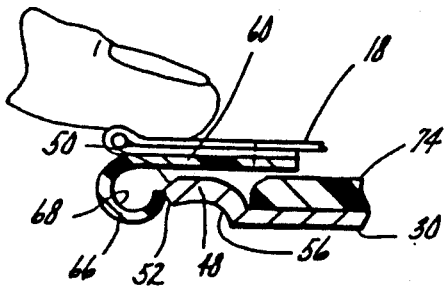

FIGS. 5 and 6 illustrate how fastener 60 is connected to the rail by mounting lip 66 on the rail and then pressing downwardly. As the extreme edge of lip 66 engages cam surface 50 of the rail, lip 66 is cammed inwardly until it passes the extreme edge of the rail and then pops outwardly as illustrated in FIG. 6.

Figure 8:
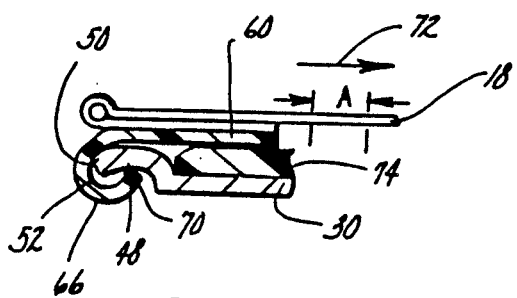

A tensile force on the cover in the direction 72, as illustrated in FIG. 8, will then cause rail lip 48 to be received into the bight of curved lip 66 until the extreme edge 70 of the curved lip slides over ridge 54 into slot 56. Lip 66 is trapped in slot 56 until the user deliberately makes a separating motion to release the cover from the sidewall.

Figure 7:
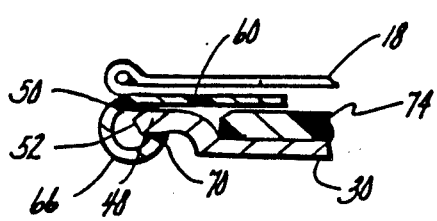
FIGS. 7-8 show the manner in which the "J" shaped extrusion is connected to the rail in a loose and in a taut cover condition, respectively.

FIG. 7 illustrates cover 18 somewhat slack such that there is a loose fit between rail lip 48 and resilient lip 66. However, in FIG. 8, the application of a tensile force on the cover will then cause the curved lip to essentially unwind in such a manner that, although it remains engaged in slot 56, the cover can move a distance "A" while being continuously in a taut condition. This unwinding feature permits the fastening structure to accommodate the stretching qualities of the vinyl cover as well as variations in the distance between the sidewalls of pick-up trucks, where the dimensional tolerances may vary as much as a ¼ inch. Further the resilient extruded lip accommodates changes in the flexibility of the cover that occur in response to temperature changes. For example, in extremely cold weather, the cover tends to become stiff whereas in warm weather it tends to become very loose. Thus, the preferred fastening structure eliminates wrinkles in the cover because it always applies a tensile force to the cover.

An identical "J" shaped fastener is connected to the opposite sidewall to cooperate with rail 24 in maintaining the cover in a taut condition.

Referring to FIG. 4, an extruded plastic molding 74 is adhesively attached to horizontal section 30 of rail 20.

Referring to FIG. 3, cover 18 is illustrated partially separated or unzipped from rails 22 and 24. The "J" shaped fastener has the flexible curved lip trimmed away a couple of inches at 80 so that user 82 can grasp the cover corner and progressively slidably unfasten or unzip the cover from the top rail by an upward motion that unwinds curved section 66 so that the extreme edge 70 of the lip clears ridge 54 and is separated from the rail.

Figure 9A:
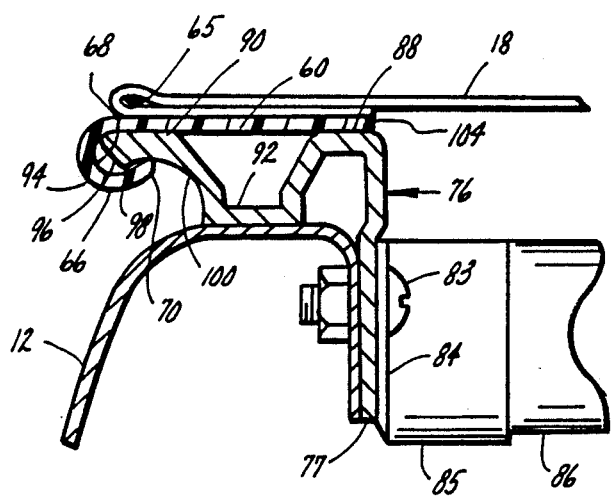
FIG. 9a is a cross-sectional view of a fragment of the sidewall of the truck showing a modified embodiment of a rail attached thereto.

FIG. 9a shows a modified embodiment of a rail 76 suitable for the same purpose as the rail 20 in FIG. 4. The rail 76 includes a vertical flange 77 that could be attached to the depending wall 28 by means of the clamp shown in FIG. 4. However, the flange 77 in FIG. 8 is attached to the depending wall by machine screws like screw 83 that not only rigidly attaches the flange to the depending wall, but also passes through a lobe 84 on one side of a saddle portion 85. The saddle portion is actually located between two lobes, but only lobe 84 is shown in the drawing. In this embodiment the saddle portion receives and supports one end of an aluminum bow 86 that takes the place of the wooden slat 44 shown in FIG. 4.

The top surface of the rail 76 has two flat sections 88 and 90 separated by a valley 92 that can be used as a channel to collect any water that inadvertently works its way under the "J" shaped fastener 60. Since this fastener extends longitudinally along almost the entire sidewall 12, the only place that water can enter is in limited open areas at the ends of the rail where the rail 76 joins another rail from the next adjacent wall of the cargo box 11. The part of the extrusion that forms the valley 92 can also serve to space the flat sections 88 and 90 above and away from the upper most part of the sidewall 12. However, it is not necessary that the bottom surface of the valley 92 even touch the upper edge surface of the sidewall 12, although it may do so.

The part 92 may be considered a base portion of the rail 76, and the part 90 may be considered to be an outer flange of the rail, which extends upwardly and outwardly away from the base portion, and, therefore, away from the cargo area. The outermost edge 94 of the flange 90 in this embodiment is shown as having a relatively small radius of curvature as viewed in this cross-sectional drawing, and the surface 96 below the edge extends downwardly and inwardly to help define a bead 98, which is the thickest part of the flange. From the bead, the lower surface 100 curves upwardly and inwardly and then downwardly to define a surface that corresponds to the slot 56 illustrated in FIGS. 5–8.

Figure 9B:
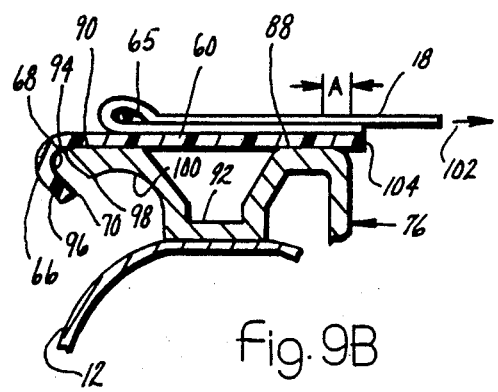
FIG. 9b is a cross-sectional view similar to that in FIG. 9a except that the cover is stretched more tightly.

Although the bight 68 causes the lip 66 of the resilient fastener means 62 to embrace the outer part of the flange 90, the inner surface of the bight does not necessarily conform closely to the surface of the flange but, as in this instance, touches it only in limited areas. This makes it easier for the bight to uncoil when force from any source pulls the edge part of the cover 18 and the fastener 60 attached to it in the direction of an arrow 102, as shown in FIG. 9b. As previously stated, such force can be due to a reduction in the temperature of the environment, causing the cover 18 to shrink, or it can be caused by variations in the manufacturing tolerance of the cover or the cargo box 11. Normally, the extreme edge 70 of the lip 66 is relatively close to or even in contact with the lower surface 100 of the flange as that extreme edge extends inwardly in the general direction of the central part of the cover 18. However, it is not necessary that there actually be contact between the extreme edge 70 and the surface 100. When force is applied in the direction of the arrow 102 to force the edge 104 of the main or base portion of the fastener 60 by the distance A to the position shown in FIG. 9b, the bight 68 uncoils to the necessary extent from its normal curvature, and the extreme edge 70 draws away from the surface 100. The inner surface of the bight 68 remains in contact with the edge 94 of the flange 90 so that there is no loss of sufficient engagement between the flange and the bight. The flexible cover 18 remains held so that it is still taut across the otherwise open top of the cargo box 11.

FIG. 10 shows a perspective view of only a small fragment of the cargo box 11, specifically, a fragment near the left front corner of the box at the intersection of the sidewall 12 and the front wall 15. The rail 76 extends longitudinally along the sidewall 12 to its end 106. Similarly, the rail 25 extends longitudinally along the end wall 15 to the end 107 which leaves a small gap 108 between the ends 106 and 107.

The rail 25 has two outwardly extending flanges 109 and 111 that are parallel to each other and extend longitudinally along the entire length of the rail. These flanges extend upwardly from a base portion 112 that rests on or close to the upper edge of the wall 15, and the forward edge of the base portion includes a depending flange 113 that extends down along the front surface of the front wall 15.

The extruded fastener 60 attached to the front edge of the cover 18 can be fitted over either of the flanges 109 and 111 depending, primarily, on the season of the year. The material of which the cover 18 is made is more elastic in one direction than it is in the perpendicular direction, and it is preferable to arrange the cover so that it is less elastic in the longitudinal direction thereof, as indicated by the arrow 21 in FIG. 1, than it is in the transverse direction indicated by the arrow 19. These arrows are also shown in FIG. 10. Arranging the cover 18 so that its greater elasticity is in the transverse direction of the arrow 19 makes it possible to use rails having only a single flange for each rail as in the case of the rails 12 and 14 shown in FIG. 2 and the rail 76 shown in FIGS. 9 and 10. The fastening means 60 along the sides of the cover 18 can be snapped into place on these rails on the sidewalls, even if the cover 18 and the lips 66 have to be stretched to some extent to do so. Such stretching of the cover is not possible in the longitudinal direction of the cover 18 as designated by the arrow 21, and the lips 66 cannot be stretched far enough to do the job, alone, especially if the cover has shrunk due to cold weather. Some degree of expansion is possible due to the resilience of the fastening means that engages the rail 22 along the tailgate 16, but there is not enough resilience to accommodate all of the necessary changes while still keeping the cover 18 taut. By providing two flanges 109 and 111, the fastening 60 along the front edge of the cover can be made to engage whichever of these flanges produces the best fit. In the winter, it is likely to be the flange 109 and in the summer it is likely to be the flange 111.

FIG. 10 also shows two reinforcing straps 114 and 116. These are sewn onto end portions of the resilient fastening means 60 along the side edge and forward edge of the cover, respectively, to prevent the cover material from being pulled away from the extruded, resilient fasteners 60 at this corner of the cover. Similar reinforcing straps are preferably sewn on at each of the four corners of the cover.

Figure 12:
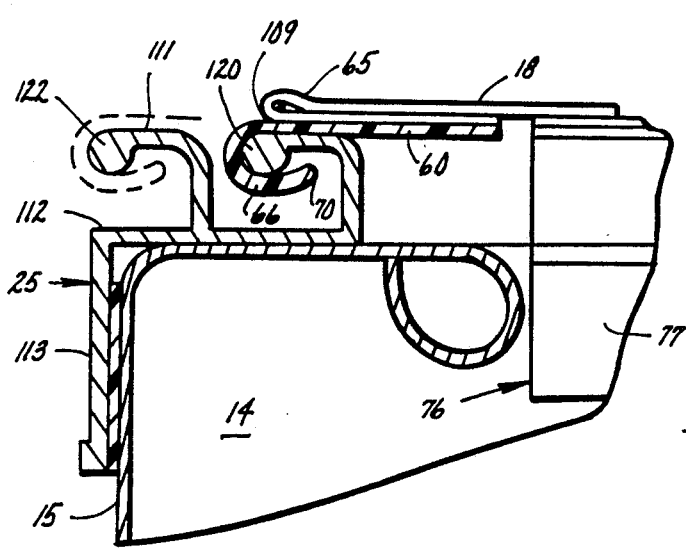
FIG. 12 is a cross-sectional view of a modified multi-position rail attached to the front wall of a cargo box of a truck.

FIG. 12 shows the multi-lip rail 25 of FIG. 10 in greater detail. The depending flange 113 is firmly attached to the outer, or forward, surface of the front, or cab, wall 15 by a double-sided, high-density foam tape 118 of a type commonly used to attach panels to vehicles. Such tape is used because of its ability to hold metal panels together firmly in all kinds of weather. The pressure exerted on the rail 25 in keeping the cover 18 taut pulls the flange 113 against the tape 118 and the tape against the wall 15, keeping these components together rather than tending to separate them.

The lips 124 and 126 of flanges 109 and 111 have round beads 120 and 122, and the surfaces 128 and 130 of both flanges extend upwardly from the base 113 and then outwardly, or away, from the central region of the cargo box 11, forming barriers that have inverted L-shaped cross sections. As in the structure shown in FIGS. 7-9, the lip 66 of the fastener 60 curves around either of the lips 124 and 126 and back generally toward the central region of the cover 18.

Figure 11:
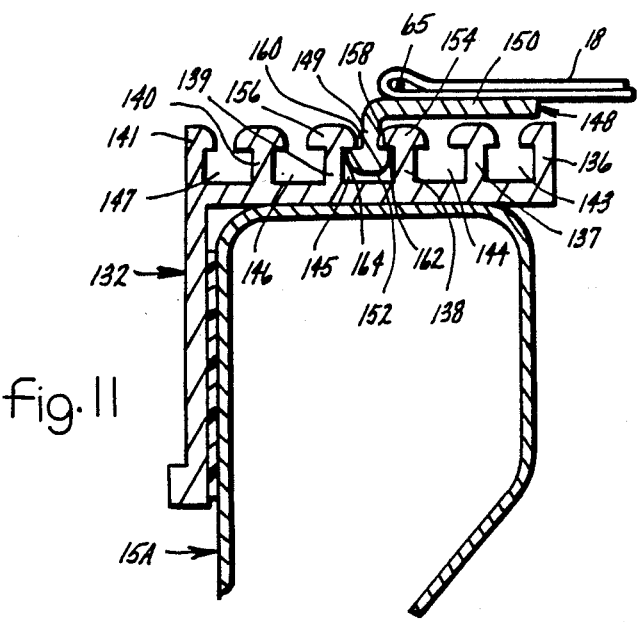
FIG. 11 is a cross-sectional view of a fragment of the front wall of a cargo box as shown in FIG. 10 along the line 11—11.

FIG. 11 shows another embodiment of a rail 132 having multiple lips. The rail 132 has a base 134 and a depending flange that is attached to the front wall 15A of a slightly different cross-sectional configuration than the wall 15 in FIG. 11. The rail 132 has several barriers, or flanges, 136-141 that divide the space above the base 134 into five slots 143-147, each shaped like an inverted T.

Instead of a J-shaped resilient fastener like the fastener 60 in FIG. 12, the fastener 148 in FIG. 11 has a forward edge, or flange 149, that extends down from a base 150 and terminates in a head or cross member, 152, so that the cross section of the flange 149 with the cross member 152 is an inverted T. The base 150 is stitched or otherwise firmly attached to the cover 18 and it anchors the cover firmly to the rail 132. The vertical flange 149 of the fastener 148 is narrow enough to pass between the juxtaposed cross members 138 and 139 or between the cross members at the tops of any of the other barriers.

While the J-shaped resilient fastener 60 in FIG. 12 can be snapped over at least the flange 111, and possibly over the flange 109, the fastener 150 in FIG. 11 cannot be snapped into place that way. In fact, in all multi-barrier rails, it is preferable to slide the fastener in longitudinally into the proper slot. There is ample room to do so, since the thickness of the lip 66 of the J-shaped fastener 60 in FIG. 12 is less than the minimum distance between the flange 109 and the flange 111. Likewise, the thickness of the flange 149 in FIG. 11 is less than the minimum distance between the cross members 154 and 156.

The cross member 152 on the fastener 150 locks under the cross members 154 and 156 on each side of it. As a result, there is contact between the top surfaces 158 and 160 of the cross member 152 and the bottom surfaces 162 and 164 of the cross members 138 and 139 to hold the fastener 150 firmly in place. The same holding structure is available if the cross member 152 is slid into any of the other slots 143, 144, 146, or 147.

In order to describe the sequence of attaching the cover 18 to the cargo box 11 whichever multi-barrier rail is used, reference will be made again to FIG. 2. First, the fastener means 60 or 150 is slid lengthwise into the slot in the front rail 25 to engage the proper barrier or the barrier believed to be proper. When that edge of the cover is in place, the fastener 60 along either side of the cover is engaged with the rail on that side of the cargo box 11. Third, the resilient fastener 11 at the tailgate 16 is snapped down into engagement with the flange on the tailgate rail. If this is impossible or leaves the cover too loose, the fastener means along the side is released and the front edge of the cover 18 is slid into engagement with a more correct flange on the rail 25. Then the side fastener and rail are re-connected, the fastener 60 and tailgate rail 22 are snapped together, and, finally, the fastener on the other side of the cover is snapped down onto that rail.

We claim:

1. A cover structure for a cargo box that comprises an upwardly extending side wall that has an upper edge and defines a boundary of the cargo area of the box, the cover structure comprising:

a flexible, substantially non-resilient cover to fit the cargo box and comprising upper and lower surfaces and a plurality of edges around a central region;

a rail rigidly attached to the side wall and comprising a base portion that extends longitudinally along the upper edge of the side wall and a longitudinal flange having a surface that extends upwardly and outwardly away from the cargo area to a longitudinal edge; and resilient fastener means extending longitudinally along and joined to a first edge of the cover, a surface of a longitudinal edge portion of the fastener means being formed so that it extends away from the lower surface of the cover and then back generally toward the central region of the cover and terminates in a free edge defining a bight having a concave surface having opposite sides resiliently movable with respect to one another and dimensioned to fit around the longitudinal edge of the flange but to have only limited contact therewith, whereby the edge portion of the fastener means is free to unfurl to allow the resilient fastener means to maintain pressure between the surface of the longitudinal flange and the concave surface of the bight as the edge portion is being unwound from the rail by a motion in a direction at right angles to the rail, and also when the cover expands or contracts due to temperature conditions.

2. Means for releasably fastening a flexible, substantially non-resilient sheet to a support means, comprising:
   a substantially non-resilient flexible sheet;
   an elongated first rail member, and means for fastening same to the support;
   an elongated second rail ember, first means for fastening the second rail member to the support means in a position spaced with respect to the first rail member, and second means for fastening the sheet to the second rail member;
   the first rail member having a longitudinal flange;
   fastener means attached to the flexible sheet such that the sheet is generally taut when the fastener means is disposed adjacent said first rail member, the fastener means including a generally J-shaped fastener member having a generally uniform cross-section having a longer side fastened to the flexible sheet, and a shorter side having a terminal edge resiliently movable with respect to the longer side about a bight to provide an opening between the terminal edge of the shorter side and the longer side for removing the longitudinal flange from a position between the opposite sides of the J-shaped fastener member, the J-shaped fastener member being removable from the rail flange by a pulling motion of the shorter side of the J-shaped fastener member in a direction at right angles to the flange whereby the terminal edge of the shorter side is moved away from the longer side to widen said opening as the terminal edge is moved with respect to the longitudinal flange of the rail member, and the resiliency of the J-shaped fastener member maintains the sheet in a taut condition as the sheet expands and contracts due to temperature changes.

3. Means for releasably snapping a flexible, substantially non-resilient sheet on to a support means, comprising;
   a substantially non-resilient flexible sheet,
   an elongated first rail member, and means for fastening same to the support, the first rail member having a longitudinal flange;
   an elongated second rail member, first means for fastening the second rail member to the support means in a position spaced with respect to the first rail member, and second means for fastening the sheet to the second rail member;
   fastener means attached to the flexible sheet such that the sheet is generally taut when the fastener means is disposed adjacent the first rail member, the fastener means including a generally J-shaped fastener member having a longer side fastened to the flexible sheet, and a shorter side having a terminal edge resiliently movable with respect to the longer side about a bight to provide an opening between the shorter side and the longer side for receiving the longitudinal flange to a position in said opening, the rail flange being receivable between the sides of the J-shaped fastener member by flexing the terminal edge of the shorter side in abutment with the flange until the terminal edge snaps around the flange to hook same in the opening in the J-shaped fastener member by a motion of the fastener member in a direction at right angles to the flange, whereby the resiliency of the J-shaped fastener member maintains the sheet in a taut condition as the sheet expands and contracts due to temperature changes.

4. A covering structure for an open-topped cargo box that comprises walls extending upwardly along the perimeter of a central space, the structure comprising:
   a rail to be attached to one of the walls to extend along the top of that wall, the rail comprising a plurality of spaced, rigid parallel flanges extending along the upper surface of the rail and defining a slot between each pair of flanges, the surface of each flange on the side thereof facing away from the central space extending outwardly to an edge of that flange, said edge being spaced from the closest part of the next-adjacent flange by a distance less than the distance between adjacent flanges to leave a gap between each pair of the flanges;
   a substantially non-resilient cover comprising an edge portion;
   resilient J-shaped fastener means extending longitudinally along and joined to the edge portion of the cover, a surface of a longitudinal edge portion of the J-shaped fastener means being formed so that it extends away from the cover and then back generally toward the central region of the cover and terminates in a free edge defining a bight having a concave surface having opposite sides resiliently movable with respect to one another and dimensioned to fit around the longitudinal edge of a selected flange but to have only limited contact therewith, whereby the edge portion of the J-shaped fastener means is free to unfurl to allow the fastener means to maintain pressure between the surface of the selected longitudinal flange and the concave surface of the bight as the edge portion is being unwound from the rail by a motion in a direction at right angles to the rail.

* * * * *